|  |  |
|---|---|
| United States Patent [19] | [11] Patent Number: 4,550,808 |
| Folson | [45] Date of Patent: Nov. 5, 1985 |

[54] BRAKE FOR TWIN WHEEL CASTERS

[75] Inventor: Henry J. Folson, Redondo Beach, Calif.

[73] Assignee: Illinois Tool Works Inc., Chicago, Ill.

[21] Appl. No.: 575,135

[22] Filed: Jan. 30, 1984

[51] Int. Cl.$^4$ .................. B60B 33/00; F16D 51/00
[52] U.S. Cl. ........................ 188/1.12; 16/35 R; 188/74
[58] Field of Search .......... 188/1.12, 31, 68, 69, 188/74, 265; 16/35 R

[56] References Cited

U.S. PATENT DOCUMENTS 4,333,207  6/1982  Atwood .................. 188/1.12 X

FOREIGN PATENT DOCUMENTS 2741122  3/1978  Fed. Rep. of Germany ..... 16/35 R
3130100  2/1983  Fed. Rep. of Germany ..... 16/35 R
58-12803  1/1983  Japan .................. 16/35 R Primary Examiner—Bruce H. Stoner, Jr.
Assistant Examiner—Richard R. Diefendorf
Attorney, Agent, or Firm—T. W. Buckman; David I. Roche

[57] ABSTRACT

A brake is provided for twin wheel casters. A brake lever extends between the wheels and is depressed by a toe. This rocks a link through a toggle position and presses a sheet metal brake shoe of generally W-shape against the inner drum or surface of the wheel flange to lock the wheel against rotation. Reverse movement of the lever is effected by a toe to unlock the brake. Edges of the sheet metal brake shoe impinge against the inner surface of the wheel flanges to lock the wheel, and locking action may be augmented by serrating the inner surface of the wheel.

10 Claims, 6 Drawing Figures

BRAKE FOR TWIN WHEEL CASTERS

BACKGROUND OF THE INVENTION

Casters are well known in the furniture art and comprise wheels mounted for rotation about a generally horizontal axis, and for swiveling about a generally vertical axis. Casters are generally used in connection with furniture that is to be moved about, and are particularly prevelant in office furniture and computer furniture. Caster wheels may be made of metal with rubber tires, or of plastic with rubber tires, or they may be all plastic. In many instances hollow plastic wheels are used in twin pairs with mounting structure intervening between the twin wheels.

The wheels must be free to turn about their axles for movement of the furniture from one place to another, but in many instances it is necessary to brake the caster wheels to maintain the furniture fixed in a given location. Various structures are known for braking caster wheels, and U.S. Pat. Nos. 3,914,821; 4,035,864; and 4,077,087 are mentioned as exemplary. In the first of the foregoing patents a shaft having a cam thereon is rotated to press a brake shoe against the inner surface of the caster wheels which comprise cup-shaped rollers, and which are adapted to be deformed when in locked or braked position. The wheel or roller must be made of resiliently deformable plastic material.

The second of the foregoing patents discloses a structure in which an over center mechanism or link operates against a resilient spring. However, the braking structure operates on the exterior of the caster wheel. The third of the foregoing patents shows links for operation of a brake shoe which presses against the exterior of the caster wheel.

In addition to the foregoing there have previously been twin wheel caster brakes which rely on a pin dropping in between pointed fins or ribs inside the rim of the wheels to prevent rotation. This requires special wheels, and may also develop a condition in which the locking pin jams against the tip of a wheel rib and does not engage properly.

OBJECTS AND SUMMARY OF THE PRESENT INVENTION

It is an object of the present invention to provide twin wheel casters using standard wheels with internal brake shoe operation.

It is further an object of the present invention to provide twin wheel casters having a positive, over center internal engagement which will not release accidentally and which is substantially insensitive to tolerance and wear.

It is further an object of this invention to provide twin wheel casters having simple foot operation requiring no stooping or bending for application, and in which there is an internal brake and the external operator engages the wheel hubs to augment locking action.

Twin wheel casters with a brake constructed in accordance with the present invention utilize standard hollow plastic wheels in confronting relation. An operating lever engageable by one's foot pivots about the wheel bosses and bears against them when the brake is engaged to supplement the braking action on the wheels. A link toggles between the operating lever and a metal brake shoe which is shaped somewhat in a W-shape having two edges which press against and dig into the inside of the wheel rim. This brake shoe is designed to flex a controlled amount to absorb manufacturing tolerances and wear. A return spring engages the brake shoe and retracts it upon release so that the brake does not drag. The spring acts in balanced fashion on the brake shoe so that both edges thereof are held clear. This spring in returning the brake shoe also returns the brake lever, the brake being released by an upward movement of one's toe beneath the brake lever.

DESCRIPTION OF THE DRAWINGS

The present invention will best be understood with reference to the following specification when taken in connection with the accompanying drawings wherein.

DETAILED DESCRIPTION OF THE ILLUSTRATED EMBODIMENT

Figure 1:
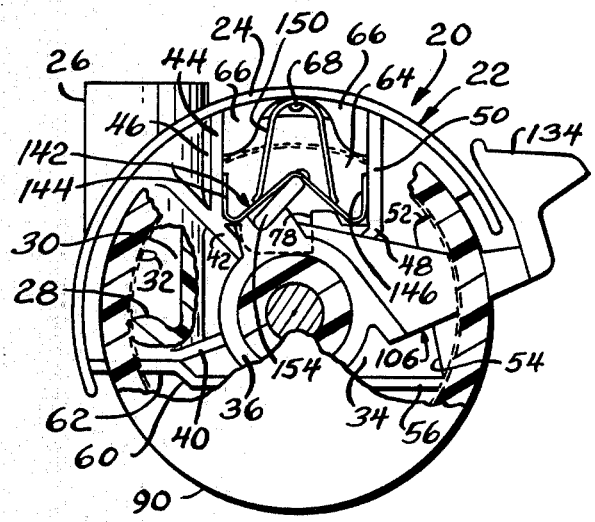
FIG. 1 is a side view of a caster constructed in accordance with the present invention with parts broken away and showing the brake in released position.

A caster 20 constructed in accordance with the present invention includes a base or housing 22 of integral, molded plastic construction and made of a suitable tough plastic resin material such as nylon. The base or housing 22 includes a substantially semi-cylindrical cap or flange 24 departing slightly from a true cylindrical construction in that it is thicker in the center, and tapers in thickness toward either end thereof. A cylindrical socket 26 extends vertically through the cap or flange 24 for receipt of a vertical pin (not shown) for vertical attachment to an article of furniture for swiveling relative to such article of furniture. The socket 26 is provided at its lower end with a domed protuberance 28 for receipt of the end of the pin for a minimal friction engagement therewith, and the inner bore 30 of the cylindrical socket 26 is provided with a pair of axially narrow protuberances 32 for fitting in a groove in the pin to hold the caster associated with such pin.

The socket 26 is reinforced relative to the cap or flange 24 in that it extends through the cap or flange and is substantially tangent to the inside surface of the cap. In addition, there is a web 34 lying in a central plane as considered from end to end of the cap 24 and joined to the socket 26. A central boss 36 extends through the web 34 and is counter bored at 38 at either end. Radial flanges 40 and 42 extend outwardly from the boss 36 to the socket 26, providing further reinforcement. As will be apparent, the boss is just slightly longer axially than is the diameter of the socket 26, while the flanges are nearly as wide as the length of the boss. The vertical flange 44 extends upwardly from near the outer end of the flange 42 to the cap or flange 24, nearly tangent to the socket 26, and joined thereto by material 46. A radial flange 48 extends upwardly to the right (FIG. 1) in mirror image relation to the flange 42 about a vertical plane through the center of the boss 36, the boss being concentric with the cap or flange 24. The flange 48 is shorter than the flange 42, and a vertical flange 50 extends upwardly from the outer edge thereof to the cap 24. It will be understood that all of the flanges 40, 42, 44, 48 and 50 are axially symmetrical about the web 34. As will be seen, the flange 50 extends to the cap 24, thus providing reinforcement for the cap.

The web 34 at the right edge is recessed on a relatively short, substantially radial line 52, and on a connecting oblique line 54. The web is terminated at the bottom by a horizontal flange 56 spaced just slightly below the boss 36 and offset upwardly at 60 to a horizontal flange section along the underside of the socket as shown at 62.

The web 34 is relieved above the socket and between the two flanges 46 and 50 as generally identified by the numeral 64. Specifically, gussets 66 of the web remain at the upper corners between the cap 24 and the flanges 44 and 50, having curved free edges, the outline in FIGS. 1 and 2 generally resembling the outline of a bell. A small dimple or protuberance 68 extends down into this space from the undersurface of the flange 24 for positioning of the biasing spring as will be brought out shortly hereinafter.

A remnant of the web provides a right angled shoulder 70 protruding upwardly and inwardly about at the junction of the flanges 42 and 46, while another portion of the flange extends in and to the left at 72 essentially from the junction between the flanges 48 and 50, being stepped up at 74 and leaving a recess 76. A shoulder 78 lies to the left of the raised portion 74.

The parts as heretofore shown and described are axially symmetrical. A bore 80 extends between the counter bores 38 and receives an axle 82. The central portion of the axle forms a tight fit in the bore 80 and is provided with spiral splines or ridges 84 which bite into the plastic material surrounding the bore as the axle is driven into place, thereby insuring the axle will remain in its intended position. An annular flange 86 at one end of the central splined section 84 limits the depth of insertion of the axle. The opposite ends of the axle are provided with annular ridges 88 which cooperate with complementary portions of wheels as shortly will be described.

There are two wheels 90 of identical construction, each being of generally concave-convex configuration. Each wheel includes a somewhat dish-shaped disc 92 and an annular cylindrical flange 94. Each wheel further has a hub 96 with triangular re-inforcing gussets 98 extending between the hub and the disc. Each hub is provided with a bore 100, and each bore is provided with a plurality of annular recesses or rings 102. The recesses 102 receive the annular ridges 88 on the ends of the axle to retain the wheels axially in place while allowing ready rotation thereof relative to the axle. The wheels are assembled with the axle by a press-on operation. The inner surfaces 104 of the wheel flanges are generally smooth, and serve as brake drums as will be brought out shortly hereinafter. The wheels are of conventional configuration and are operable with the brake mechanism of the present invention without modification of the wheels.

Figure 4:
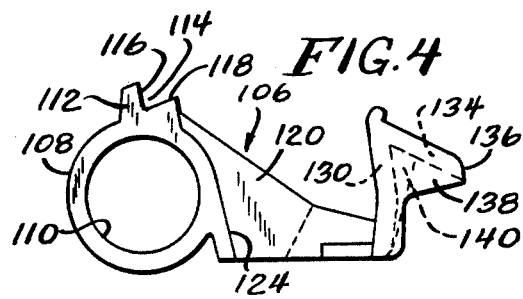
FIG. 4 is a side view of the brake operating lever.
Figure 5:
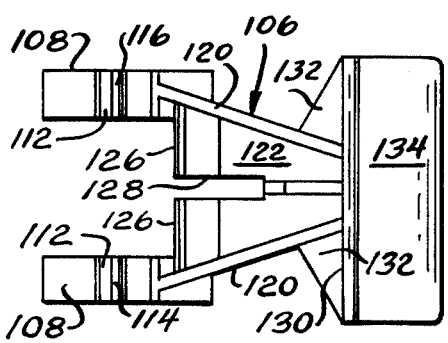
FIG. 5 is a top view of the brake operating lever.

A brake applying lever 106 is shown in all of FIGS. 1–5, and particularly in FIGS. 4 and 5. The brake applying lever includes a pair of axially spaced mounting rings 108 having inner bores 110 dimensioned for the rings to fit over the hubs 96 of the wheels for pivoting thereon. Each ring is provided near the upper portion thereof with an upwardly extending saddle 112 having a notch 114 therein defined by a wall 116 diverging to the left from a radius drawn from the center of a ring 108 to the apex of the notch 114 and forming a shallow angle with such radius. The notch further is defined by a wall 118 lying to the right of the aforesaid radius and forming therewith a larger angle approaching 90 degrees.

The rings 108 are joined by generally radially extending converging arms 120 leading to an interconnecting web 122. External flanges 124 and internal flanges 126 reinforce the connection of the arms to the rings and the arms to the web 122. The inner flanges 126 and the web 122 are centrally recessed at 128 to provide clearance for the web 34.

A wall 130 upstands from the web 122 and is joined to the arms 120 by triangular gussets 132 coplanar with the web 122. Spaced down slightly from the top edge of this wall there is a diagonal toe flange 134 having a curved outer corner 136, the toe flange being braced to the wall at its extremities by gussets 138, and also by internal gussets 140. The toe of one's shoe may press down on the toe flange or plate 134 to apply the brake as will be discussed shortly hereinafter, and conversely the brake may be released by lifting beneath the flange or plate 134 with the toe.

All of the parts of the caster as heretofore shown and described except for the axle 82 which is steel are molded of a suitable plastic resin material, nylon being a preferred example. A sheet metal brake shoe 142 having a generally W shape overlies the saddles 112 and comprises parallel arms or flanges 144 and 146 respectively lying against the inner faces of the flanges 44 and 50. These arms are joined at rounded corners to an inverted V shaped central section having an aperture 148 at the apex thereof and located equidistantly from the ends of the brake shoe. The brake shoe is of sufficient length as best may be seen in FIG. 3 to underlie the brake drum surfaces 104 of the respective wheels 90.

An inverted U-shaped spring 150, also of sheet metal, overlies the center portion of the brake shoe and has an aperture 152 at its apex receiving the dimple or protuberance 68 on the inner face of the cap 22. The tips or free edges of the U-shaped spring 150 splay outwardly and slide along the surfaces of the inverted V-shaped central section of the brake shoe 142. Both the brake shoe and the spring are preferably made of stainless steel, and are resilient.

A final part is molded of nylon or other suitable plastic resin material and comprises a link 154. The link comprises an elongated flat member having rounded edges, and intermediate its length having an upstanding protuberance 156 received in the aperture 148 in the brake shoe 142. The link is further provided on its lower edge with an elongated depending portion 158 fitting between the rings 108 of the brake lever 106. The adjacent shoulders 160 of the link are received in the saddles 112 on the rings 108.

With the brake lever 106 in the raised position as shown in FIG. 1 the link 154 lies against the saddle wall 118 and the brake shoe 142 is in a lowered position spaced away from the drums 104 on the inner sides of the rims or flanges 94. If one presses with the toe against the flange or plate 134 the lever is rocked from the position of FIG. 1 to that of FIG. 2. This causes the link 154 to assume a generally upright position against the wall 116 of the saddle 112, passing through an over center position as it does so. The link 154 thus acts as a toggle link, and in so doing raises the brake shoe 142 so that the edges of the side arms or flanges 144 abut the brake drum surfaces 104 of the flanges, and actually dig into such surfaces to some extent, thereby securely locking the caster wheels against rotation. The brake shoe is somewhat deformed in being shifted from unlocked to locked position, and exerts a considerable downward pressure on the link. This causes the rings 108 to press down against the wheel hubs 96 to augment the braking action.

Figure 2:
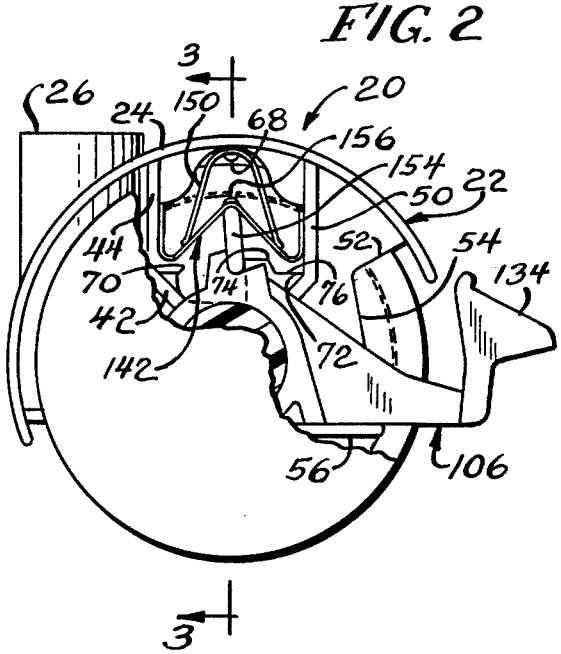
FIG. 2 is a view similar to FIG. 1 with fewer parts broken away and showing the brake in locked position.
Figure 3:
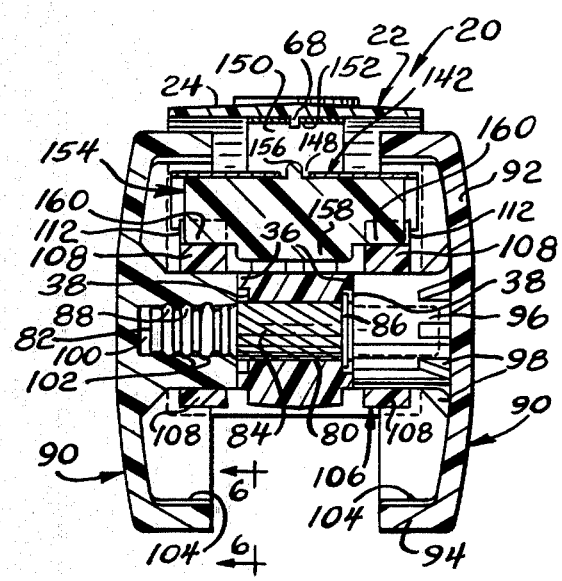
FIG. 3 is an axial sectional view taken substantially along the line 3—3 in FIG. 2.

Subsequently, to unlock the caster for transportation of the furniture on which it is mounted it is only necessary to insert a toe beneath the plate 134 and to raise the same to rock the lever from the locked position of FIG. 2 to the unlocked position of FIG. 1. The spring 150 moves the brake shoe away from the inner drum surfaces of the flanges 94 after the link has passed through its toggling position in the opposite direction, thereby insuring complete release of the brake drums by the brake shoe.

Figure 6:
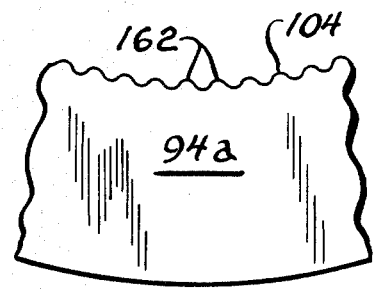
FIG. 6 is a greatly enlarged axial view taken substantially along the line 6—6 in FIG. 3 of the inner surface of a caster wheel showing a modification.

It will be obvious that both locking and unlocking of the caster brake can be effected without the necessity of bending over, as has been necessary with some prior art caster brakes. Both locking and unlocking are effected with the toe of one's shoe with a person in standing position. Although the brake locking is quite thorough I have disclosed an improvement modification in FIG. 6. In this figure, wherein the parts are shown on a greatly enlarged scale, the cylindrical flange 94a is provided on its inner or brake drum surface 104a with a series of axially directed serrations 162 providing alternating hills and valleys. The edges of the brake shoe will drop into the valleys and thereby afford a more positive braking action than is afforded in the first disclosed form of the invention wherein braking is frictional augmented by some resilient digging in of the sharp edges of the brake shoe. In the modification of FIG. 6 there is a clear interlocking of the edges of the brake shoe with the serrations.

The specific examples of the invention as herein shown and described are for illustrative purposes. Various changes in structure will no doubt occur to those skilled in the art and will be understood as forming a part of the present invention insofar as they fall within the spirit and scope of the appended claims.

The invention is claimed as follows:

1. A braking wheel construction comprising a wheel having a cylindrical flange with the inner surface thereof accessible as a brake drum, means for mounting said wheel including an axle, a brake operating lever pivotable about said axle, a brake shoe engageable with said inner surface, and an over center mechanism including a flat link member capable of snapping into and out of spreading engagement between said brake operating lever and said brake shoe, and spring means for resiliently urging said shoe out of engagement with said surface, a first edge of said link being disposed in a notch in said lever, and a second edge of said link being in contact with said shoe, whereby pivoting of said lever in one direction forces said shoe into braking engagement with said surface and said shoe is released from such braking engagement upon pivoting of said lever in an opposite direction.

2. A braking wheel construction as set forth in claim 1 wherein said wheel has a hub, and wherein said lever is pivotally mounted on said hub.

3. A braking wheel construction as set forth in claim 1 wherein said brake shoe has a W-shape with a central apex and two upstanding side arms each having a free end, said link engaging said apex and pressing said free arm ends against said surface in braking engagement.

4. A braking wheel construction as set forth in claim 3 wherein the inner surface of said cylindrical flange is serrated.

5. A braking wheel construction as set forth in claim 1 wherein said spring means comprises a U-shaped spring bearing on said brake shoe and urging said shoe toward releasing position.

6. A braking wheel construction comprising a pair of dished wheels each having a cylindrical flange with the inner surface thereof accessible as a brake drum, means for mounting said wheels in coaxial confronting relation including an axle, a brake operating lever disposed in part between said wheels and pivotable about said axle, a common brake shoe engageable with both of said surfaces, a wheel housing overlying a portion of both of said wheels, and a U-shaped spring engaging said brake shoe on opposite sides of a central apex of said brake shoe and acting between said housing and said brake shoe resiliently urging said shoe toward a releasing position said brake shoe comprising an elongated W-shaped member of resilient construction having said apex and a pair of side arms with free ends, and a link acting between said brake operating lever and said common brake shoe upon pivoting of said lever in one direction to force said shoe simultaneously into braking engagement with both of said surfaces and releasing said common brake shoe from such braking engagement upon pivoting of said lever in the opposite direction said link seating in said apex and forcing said arm free ends against both of said inner surfaces upon pivoting of said lever in said one direction.

7. A braking wheel construction as set forth in claim 6 wherein said brake operating lever has a saddle, and wherein said link engages in said saddle.

8. A braking wheel construction as set forth in claim 7 wherein said link is elongated, being of substantially the same length as said brake shoe.

9. A braking wheel construction as set forth in claim 6 wherein said wheels have confronting hubs, and wherein said lever is pivotally mounted on said hubs.

10. A braking wheel construction as set forth in claim 6 wherein the inner surfaces of said cylindrical flanges are serrated.

* * * * *